June 18, 1957 W. S. SZOKE 2,795,834
RESILIENT CLIP
Filed Feb. 17, 1955
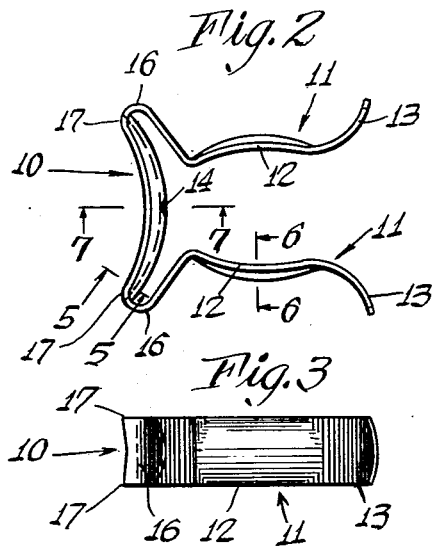
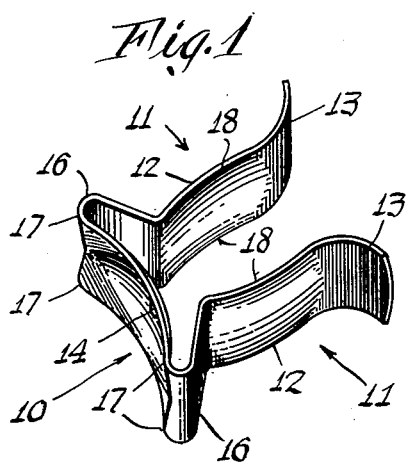
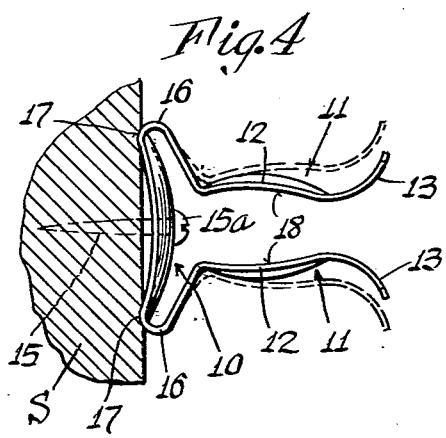
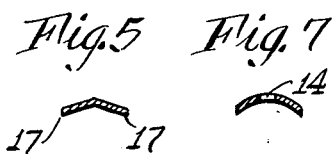
INVENTOR.
William S. Szoke
BY
Johnson and Kline
ATTORNEYS

United States Patent Office 2,795,834
Patented June 18, 1957

2,795,834

RESILIENT CLIP

William S. Szoke, Fairfield, Conn.

Application February 17, 1955, Serial No. 488,757

2 Claims. (Cl. 24—257)

This invention relates to spring clips adapted to be fastened to a wall or other supporting surface for holding thereon, usually in a vertical pendant position, various articles such as kitchen utensils, tools, brooms, etc., having more or less cylindrical handles or bodies by means of which they are resiliently engaged and held.

Such clips are formed from flat strip stock to have a back portion or base and a pair of forwardly-extending, article-supporting arms. To vary the space between the arms to better accommodate the particular article desired to be supported, or increase the resilient pressure of the arms on the article, the base of the clip is bowed longitudinally forwardly so that a single mounting screw or other fastener passing through a centrally-located hole in the base and into the wall will tend to flatten the bowed back and thus cause the supporting arms to be brought together more or less depending on the extent to which the screw flattens the bow.

Such clips have been extensively used for many years despite the fact that they have several inherent disadvantages. One of these is that being mounted on the wall by a single, centrally-located fastener, the clip was free to undesirably rotate about the axis of the fastener unless some additional anchoring means was provided. One such means was in the form of a special mounting strip of wood separately secured to the wall so as to prevent turning and having shoulders between which the edges of the base of the clip was confined. Another such means was a separate mounting plate of metal likewise having shoulders for engaging the edge of the clip's base and a hole to receive the fastener passing through the base. Tangs or barbs at the ends of the supporting plates were adapted to bite into the wall to keep the plate and the clip from rotation on the axis of the fastener.

Such additional means for anchoring the clip not only added to the cost of the installation, but increased the effort required to make it.

An object of this invention is to overcome these disadvantages without adding to the cost of the clip or the effort required to install it. To this end the clip is so formed as to provide its own anchoring means, the latter being, in the form of the invention herein disclosed as exemplary thereof, provided by transversely bowing outwardly the longitudinally-bowed base of the clip to form corners at the ends of the base which will bite into the wall or other supporting surface sufficiently to resist casual displacement of the clip from its intended position.

Another disadvantage present in the spring clips as heretofore made was the difficulty of securely holding in a pendant position rather heavy articles and those having handles or body portions to be engaged by the arms of the clip which are slippery. This can be avoided by supplying the arms of the clip with coverings of friction producing material, but this would again add to the cost of the clip.

According to the present invention, this difficulty is avoided by transversely bowing the article-engaging portions of the arms of the clip so as to present to the article to be supported only the edge portions of the arms which tend to bite into the article being supported and prevent its slipping down through the arms of the clip.

The transverse bowing of the strip metal forming the clip can be effected by appropriately shaping the dies in a four-slide forming machine used to bend and shape the base and arms of the clip, and thus the advantages of the present invention may be gained without increasing the cost of manufacturing the clip. In fact, the cost of manufacturing the clip may be reduced by the present invention because the transverse bowing of the strip stock stiffens it against torsional strains and lighter gauge material may be used if desired.

Other features and advantages will be apparent from the specification and claims when considered with the drawing in which:

Fig. 1 is a perspective view of a novel resilient clip.
Fig. 2 is a plan view of the clip.
Fig. 3 is a side elevational view of the novel clip.
Fig. 4 is a side view of the novel clip as it is secured to a supporting surface in an adjusted position, the dotted lines indicating the clip in its normal spread position.
Fig. 5 is a sectional view taken along line 5—5 of Fig. 2.
Fig. 6 is a sectional view taken along line 6—6 of Fig. 2.
Fig. 7 is a sectional view taken along line 7—7 of Fig. 2.

The spring clip of the present invention provides a strip of resilient sheet metal bent into a substantially U shape so as to have a forwardly-bowed back or base 10 and spaced forwardly-extending arms 11 between which an implement, such as the handle of a tool, broom, mop or the like, may be placed to be resiliently engaged thereby and held in position.

The arms 11 have outwardly bowed gripping portions 12 to form a socket to conveniently receive and hold round objects, and outwardly flared ends 13 to facilitate the lateral introduction of the object to the gripping portions 12. The back 10 has a single central hole 14 for receiving a screw 15 or other fastener by means of which the clip may be mounted on a wall or other suitable support.

The clip is initially formed so that the arms 11 are spaced quite far apart and the central portion of the base 10 is substantially spaced from the plane of the junctions 16 of the arms with the base portion. By flattening out the bowed base 10, as by driving the fastener 15 farther into the support which causes the head 15a of the fastener to press in on the bowed base 10, the arms 11 are brought closer together by the desired amount reducing the space between the gripping portions on the opposite arms, the arms 11 fulcruming on the bends forming the junction 16 between them and the base 10. Thus the arms 11 may be made to accommodate articles of different diameters and to increase or decrease the pressure of the arms on the article to be supported.

There being nothing on the clip itself as heretofore made to bite into the support to hold the clip in desired position against casual turning on the centrally located fastening screw 15, it was necessary to provide some additional means between the base of the clip and the ultimate support which could be held against turning and which would hold the clip against turning. Such additional means added to the cost of the clip and its installation.

I have found, however, that without adding any cost to the production of the clip, satisfactory means may be provided on the base 10 of the clip to resist casual turning of the clip on the axis of the screw 15 once the clip is secured to the support.

This has been accomplished, in the form of the invention shown, by forming the base 10 so that instead of being flat transversely it is crowned or bowed forwardly, thereby producing corners 17 at the junctions of the base with the arms, i. e., the places of contact of the clip with the supporting surfaces. With the base of the clip so formed, when the clip is fastened in place these corners 17, or acute edges as they may be termed, bite into the supporting surfaces and hold the base from rotating on the screw 15.

I have found that the transverse bowing of the base 10 does not interfere with the operation of flattening out the longitudinal bow in the base under the influence of the head of the screw 15, but does tend to stiffen the base against torsional forces and, therefore, if desired, the clip may be made of lighter gauge material without sacrificing strength.

Another problem encountered with such clips as heretofore made is that an especially slippery object required the clips to be brought together by turning in the screw 15 so as to produce excessive pressure on the object. But this closing of the arms 11 made it more difficult to apply and remove the implement by lateral movement.

I have found that this disadvantage can be overcome by bowing outwardly transversely the gripping portions 12 of the arms 11 so that contact between the gripping portions and the object to be supported is made at the corners 18 at opposite edges of each arm 11. These corners tend to bite into the surface of the article to be supported and prevent the article from slipping longitudinally as by gravity downwardly through the gripping portions 12. The arms so shaped offer very little resistance to the lateral movement of the article to and from gripping position in the clip because less tension is required to hold the article against slipping.

Here, again, I have found that the transverse bowing of the arms at the gripping portions 12 does not interfere with the proper functioning thereof, but on the contrary has advantages in that it stiffens such portions against torsional forces and permits the use of lighter gauge material if desired without sacrificing strength.

Variations and modifications may be made within the scope of the claims and portions of the improvements may be used without others.

I claim:

1. A U-shaped spring clip formed of strip metal having a base provided with a single centrally-located hole adapted to receive a mounting screw, and forwardly extending arms integral with the base and having their rear ends joining with the ends of the base, the latter being bowed forwardly longitudinally whereby contact of the base with the surface of a support is made only at the junctions of the base with said arms, the base being bowed forwardly transversely to provide, at said junctions of the base with the arms, spaced support-penetrating edge portions to bite into the surface of a support and resist casual turning movement of the clip about the axis of a screw extending through said centrally-located mounting hole when the screw is tightened in the support to secure the clip thereto.

2. A U-shaped spring clip formed of strip metal having a base provided wiht a single centrally-located hole adapted to receive a mounting screw, and forwardly-extending arms integral with the base and having their rear ends joining with the ends of the base, the latter being bowed forwardly longitudinally whereby contact of the base with the surface of a support is made only at the junctions of the base with said arms, the base being bowed forwardly transversely to provide, at said junctions of the base with the arms, spaced support-penetrating edge portions to bite into the surface of a support and resist casual turning movement of the clip about the axis of a screw extending through said centrally-located mounting hole when the screw is tightened in the support to secure the clip thereto, said arms being movably biased to move apart and tightening of a screw passing through said centrally-located hole in the base in the support causing the arms to be brought together more or less depending upon the extent to which the screw causes flattening of said bowed base, the arms having oppositely and outwardly, longitudinally-bowed portions also transversely bowed to present to an article placed in the socket article-penetrating edge portions to bite into the surface of the article being supported and resist longitudinal slipping of the article relative to said arms.

References Cited in the file of this patent
UNITED STATES PATENTS

| | | |
|---|---|---|
| 1,906,874 | Platt | May 2, 1933 |
| 2,555,053 | Myrick | May 29, 1951 |